(12) United States Patent
Wang (10) Patent No.: US 12,344,286 B2
(45) Date of Patent: Jul. 1, 2025

(54) CONDUCTOR CHAIR

(71) Applicant: Tian Yong Wang, Shrewsbury, MA (US)

(72) Inventor: Tian Yong Wang, Shrewsbury, MA (US)

( * ) Notice: Subject to any disclaimer, the term of this patent is extended or adjusted under 35 U.S.C. 154(b) by 58 days.

(21) Appl. No.: 18/458,459

(22) Filed: Aug. 30, 2023

(65) Prior Publication Data

US 2025/0074482 A1    Mar. 6, 2025

(51) Int. Cl.
*B61D 33/00*     (2006.01)
*B60N 2/06*      (2006.01)
*B60N 2/16*      (2006.01)
*B60N 2/30*      (2006.01)

(52) U.S. Cl.
CPC ............ *B61D 33/0021* (2013.01); *B60N 2/06* (2013.01); *B60N 2/163* (2013.01); *B60N 2/305* (2013.01)

(58) Field of Classification Search
CPC ...... B61D 33/0021; B60N 2/06; B60N 2/305; B60N 2002/0208; B60N 2002/022; B60N 2/16; B60N 1/163; B60N 2/24
USPC ........................................................ 297/335
See application file for complete search history.

(56) References Cited

U.S. PATENT DOCUMENTS

| | | | | |
|---|---|---|---|---|
| 3,279,850 | A * | 10/1966 | Buhler | .................. B60N 2/305 297/335 |
| 5,374,102 | A * | 12/1994 | Archambault | ......... B60N 3/063 297/344.13 |
| 2010/0102609 | A1* | 4/2010 | Confer | .................. B60N 2/305 297/335 |

FOREIGN PATENT DOCUMENTS

CN          108146306 A  *  6/2018   ........... B60N 2/1605

* cited by examiner

*Primary Examiner* — Milton Nelson, Jr.
(74) *Attorney, Agent, or Firm* — Clement Cheng (57) ABSTRACT

A conductor chair has a main seat pad and a main seat pad frame. The main pad is mounted to the main seat pad frame. The back support is mounted to a seat frame. A seat hinge is mounted to the seat frame. The seat hinge connects the main seat pad to the main seat pad frame providing the main seat pad with a bimodal operation between a vertical stowed position and a deployed position. A support frame supports a horizontal rail. The horizontal rail supports the seat frame. The seat frame is adjustable between a forward and backward position. The support frame is slide mounted to the vertical rail. Vertical rail rollers are mounted to the support frame. The vertical rail rollers roll on the vertical rail. The main seat pad frame supports the main seat pad. The base plate is connected to the vertical rail.

19 Claims, 12 Drawing Sheets

CONDUCTOR CHAIR

TECHNICAL FIELD

The present invention is in the field of conductor seat, specifically vehicle operator chair.

BACKGROUND

The vehicle operator chair has a variety of different designs to improve comfort.

SUMMARY OF THE INVENTION

A conductor chair has a main seat pad and a main seat pad frame. The main pad is mounted to the main seat pad frame. The back support is mounted to a seat frame. A seat hinge is mounted to the seat frame. The seat hinge connects the main seat pad to the main seat pad frame providing the main seat pad with a bimodal operation between a vertical stowed position and a deployed position. A support frame supports a horizontal rail. The horizontal rail supports the seat frame. The seat frame is adjustable between a forward and backward position. The support frame is slide mounted to the vertical rail. Vertical rail rollers are mounted to the support frame. The vertical rail rollers roll on the vertical rail. The main seat pad frame supports the main seat pad. The base plate is connected to the vertical rail.

The vertical rail rollers have a roller left portion, a roller right portion and a shaft portion. The vertical rail further includes a left support post and a right support post. The roller left portion rolls on a left support post exterior wall, and the roller right portion rolls on a right support post exterior wall. The vertical rail rollers include a upper rear vertical rail roller opposing an upper front vertical rail roller and a lower rear vertical rail roller opposing a lower front vertical rail roller.

An engagement member engages an adjustment receiver. The adjustment receiver is mounted to the horizontal rail. A handle retainer spring biases the engagement member to the engagement receiver. A pushback handle moves to release the engagement member from the adjustment receiver. A second engagement member engages to a second adjustment receiver. The second adjustment receiver is mounted to a second horizontal rail. A second handle retainer spring biases the second engagement member to the second engagement receiver. A latch transfer rod connects between a first pivot frame and a second pivot frame, wherein the pushback handle moves to release the engagement member from the adjustment receiver and the second engagement member from the second adjustment receiver.

The latch transfer rod has a flat rectangular cross-section with a latch transfer rod width greater than a latch transfer rod height. The back support further includes a seatback foam mounted over a seatback base. The seatback foam overlaps an upper edge of the seatback base at a seat foam upper overlap. The support frame has a support frame right wall connecting to a support frame rear wall connecting to a support frame left wall. The support frame right wall receives a right glider pad mounted to glide along a right support post right exterior wall. The support frame left wall receives a left glider pad mounted to glide along a left support post left exterior wall.

The support frame rear wall has a support frame rear wall. The support frame rear wall has a support frame rear wall opening. The support frame rear wall is more flexible and lighter than the support frame right wall or the support frame left wall. The support frame rear wall connects to a piston receiver frame. The piston receiver frame has an upper piston connection. The piston receiver frame receives a frame sheath upper extension extending upwardly from a frame sheath. The frame sheath connects to the support frame rear wall and extends upwardly above the support frame rear wall. The frame sheath upper extension extends to the piston upper connection and supports the piston upper connection. Vertical rail rollers have a pair of stiffer portions sandwiching a softer portion so that the pair of stiffer portions of the rollers wrap around the vertical posts.

The following call out list of elements can be a useful guide in referencing the element numbers of the drawings.
10 Conductor Chair
20 Back Support
21 Back Support Upper Edge
22 Back Support Upper Left Edge
23 Back Support Upper Right Edge
24 Back Support Upper Left Edge Angle
25 Back Support Upper Right Edge Angle
30 Main Seat Pad
31 Pad Front Edge
32 Main Seat Pad Front
33 Main Seat Pad Front Right Edge
34 Left Seat Hinge Frame
35 Right Seat Hinge Frame
36 Seat Front Left Edge Angle 37 Seat Front Right Edge Angle
38 Fabric Seat Cover
39 Seat Foam Upper Overlap
40 Seat Hinge
41 Seat Frame
42 Back Support Frame
43 Main Seat Pad Frame
44 Seat Frame Lower Extension
50 Height Adjustment
151 Base Plate
51 Push Back Handle
52 Right Support Post
53 Left Support Post
54 Air Support Shock
55 Support Frame
56 Locking Handle
57 Locking Handle Pivot
58 Vertical Rail
59 Horizontal Rail
60 Support Frame Hanging Bracket
61 Hanging Notch
62 Seat Pad Base
63 Seat Back Base
64 Spring Latch
65 Seat Back Foam
66 Seat Base Foam
67 Upper Position
68 Lower Position
69 Vertical Rail Roller
71 Support Frame Forward Extension
72 Main Seat Pad Frame Lower Support
73 Main Seat Pad Frame Side Flange
74 Seat Frame Back Extension
75 Horizontal Rail Support
76 Handle Retainer Spring
77 Pivot Frame
78 Engagement Member
79 Horizontal Adjustment Receiver
81 Forward Position
87 Spring Mounting Extension
82 Rearward Position
83 Upper Position
84 Lower Position
85 Latch Transfer Rod
86 Piston Upper Connection
87 Piston Lower Connection
88 Piston Receiver Frame
89 Air Shock Extension
90 Glider Pad Head Inserts
91 Right Support Post Right Exterior Wall
92 Left Support Post Left Exterior Wall
93 Support Frame Rear Wall
94 Support Frame Right Wall
95 Support Frame Left Wall
96 Right Glider Pad
97 Left Glider Pad
98 Right Glider Pad Head
99 Left Glider Pad Head
100 Piston Receiver Frame Sheath
101 Piston Receiver Frame Sheath Upper Extension
102 Frame Sheath Upper Connection
103 Support Frame Rear Wall Opening
110 Shaft Portion
111 Right Roller Portion
112 Left Roller Portion
113 Lower Rear Vertical Rail Roller
114 Lower Front Vertical Rail Roller
115 Upper Rear Vertical Rail Roller
116 Upper Front Vertical Rail Roller
176 Second Handle Retainer Spring
177 Second Pivot Frame
178 Second Engagement Member
179 Second Adjustment Receiver
180 Glider Pad Wheel
181 Stiffer Portion

DETAILED DESCRIPTION OF THE EMBODIMENTS

Figure 1:
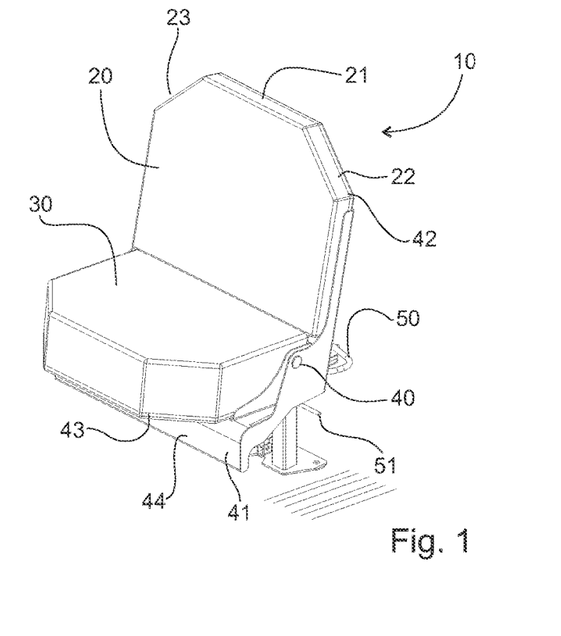
FIG. 1 is a view of the present invention conductor chair.

FIG. 1 shows the conductor chair 10 which mounts to a flat floor and can also mount to a rear wall. The conductor chair 10 has a main seat pad 30 and a back support 20. The main seat pad 30 is supported at a main seat pad frame 43. The main seat pad frame 43 is mounted to the seat frame 41 at the seat hinge 40. The seat frame 41 also supports the back support 20. The back support 20 has an upper contour defined at a back support upper edge 21, a back support upper left edge 22 and a back support upper right edge 23. The height adjustment 50 is a mechanism that raises and lowers the seat frame 41. The seat frame 41 has a seat frame lower extension 44 that extends as a flange downwardly which protrudes forwardly more than the main seat pad frame 43 when the main seat pad 30 is folded upwardly to a stowed position. The main seat pad frame 43 can be formed of a plywood plank that is connected to a bracket that is connected to the seat hinge 40. The main seat pad 30 and back support 20 are preferably formed as cushions.

Figure 2:
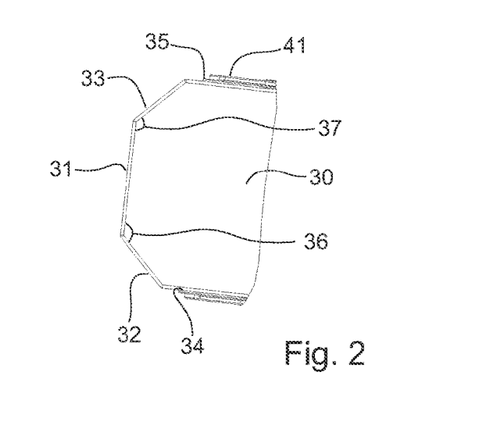
FIG. 2 is a top view of the seat edge.

FIG. 2 shows the upper view of the main seat pad 30. The main seat pad 30 has a main seat pad front edge 31 between a main seat pad front right edge 33 and a main seat pad front left edge 32. The main seat pad front edge 31 has an angle with the main seat pad front right edge 33 defined as the seat front edge angle 37. The seat front edge angle 37 is preferably 35°. Similarly, the seat front edge 31 forms a seat front left edge angle 36 main seat pad front left edge 32. The seat front left edge angle 36 is preferably 35°.

Figure 3:
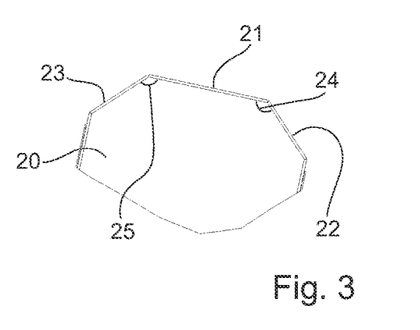
FIG. 3 is a front view of the backrest.

FIG. 3 shows the back support 20 having a back support upper right edge angle 25 and a back support upper left edge angle 24. The back support upper right edge 23 and the back support upper left edge 22 both have preferably a 35° angle to the back support upper edge 21. The back support upper right edge angle 25 formed between the back support upper right edge 23 and the back support upper edge 21 is preferably 35°. Similarly, the back support upper left edge angle 24 formed between the back support upper edge 21 and the back support upper left edge 22 is preferably 35°.

Figure 4:
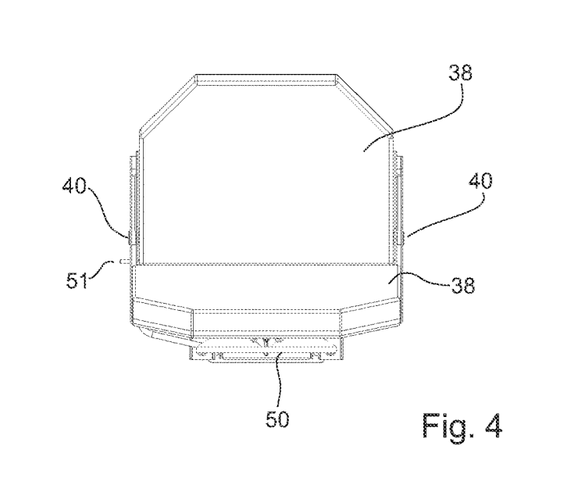
FIG. 4 is a top view of the seat.

FIG. 4 shows a top view of the seat showing the location of the seat hinge 40 being slightly forward of the back support 20. The main seat pad 30 and the back support 20 both have a fabric cover 38. The height adjustment mechanism 50 is found behind the seat. The pushback handle 51 allows adjustment in a forward and rearward sliding configuration.

Figure 5:
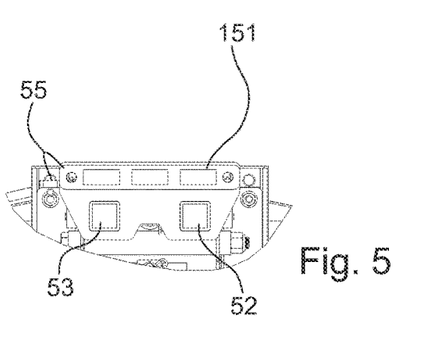
FIG. 5 is a bottom view of the mounting support frame and base plate.

As seen in FIG. 5, the base plate 151 can be connected to the right support post 52 and the left support post 53 such as by welding. The support frame 55 is mounted to ride on the vertical rails that are defined by the right support post 52 and the left support post 53. The base plate 151 secures the chair to the floor.

Figure 6:
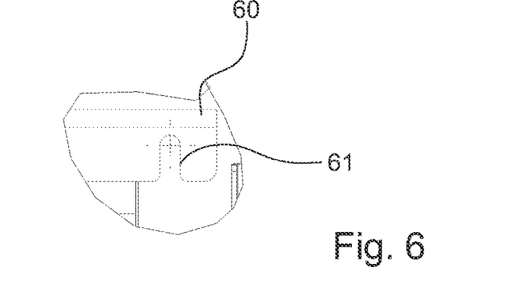
FIG. 6 is a detailed view of the support frame hanging bracket.

As seen in FIG. 6, the support frame hanging bracket 60 can mount the chair to a rear wall such as at a hanging notch 61. The support frame hanging bracket 60 can be formed as a plate that is mounted to the vertical rails 58. A connector such as a bolt or screw can mount to the hanging notch 61.

Figure 7:
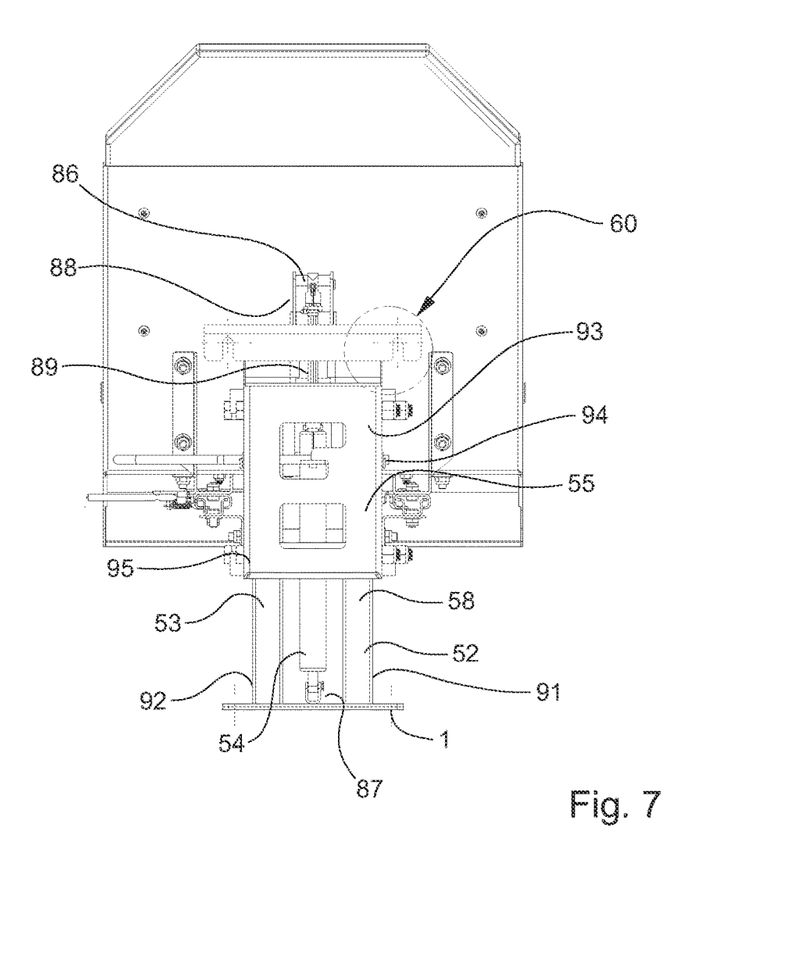
FIG. 7 is a rear view of the present invention seat.

As seen in FIG. 7, the rear of the chair has mechanisms that allow vertical and horizontal adjustment. For the vertical adjustment mechanism, a support shock 54 formed as a piston can be mounted between a piston lower connection 87 and a piston upper connection 86. The air support shock 54 dampens vertical movement while supporting the chair. The air support shock 54 is mounted between the left support post 53 and the right support post 52. The right support post has a right support post right exterior wall 91 and the left support post has a left support post left exterior wall 92.

The horizontal adjustment mechanism is mounted to the vertical adjustment mechanism. The vertical adjustment mechanism includes a fixed portion and a moving portion. The fixed portion is fixed to the floor and rear wall while the moving portion is fixed to the seat. The support frame 55 has vertical motion along the vertical rail 58. The vertical rail 58 is formed from a pair of posts, namely the right support post 52 and the left support post 53. The support frame 55 has a support frame left wall 95 and a support frame right wall 94. The support frame rear wall 93 joins the support frame left wall 95 and the support frame right wall 94. The piston receiver frame 88 is fixed to the support frame 55. The piston receiver frame 88 has a piston upper connection 86 which can be formed as a horizontal crossbar that mounts to the piston receiver frame 88. The piston receiver frame 88 can be formed as a pair of vertical walls that receive the horizontal crossbar and a left and right side of the ends of the horizontal crossbar. When the air support shock 54 extends upwardly, the air shock extension 89 extends away from the piston lower connection 87. When the air support shock 54 compresses, the piston upper connection 86 travels toward the piston lower connection 87 which is dampened by the piston. The vertical rail 58 connects to the support frame hanging bracket 60 which connects to the rear wall.

Figure 8:
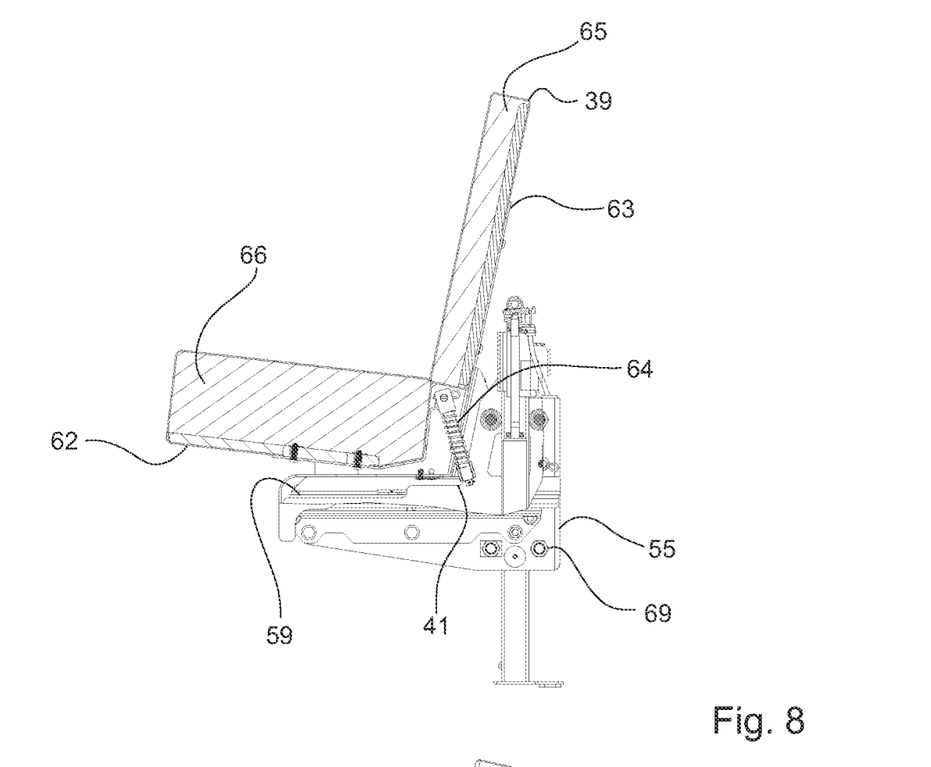
FIG. 8 is a side cross-section view of the conductor seat.

As seen in FIG. 8, the cross section side view shows that the seatback base 63 supports the seatback foam 65. The seat hinge preferably actuates with a spring latch 64 which allows stable retention in a deployed position and stood position. Preferably, the seatback foam 65 overlaps the top edge of the seatback base 63 at a seat foam upper overlap 39. The seatback base 63 can be formed of a plank of plywood having a sanded or rounded top edge that is then connected to and supported by a rear metal panel bolted or screwed to the plywood plank from the rear. The spring latch 64 connects between the seat pad base 62 and seat frame 41 which is then mounted on the horizontal rail 59 to the support frame 55. The seat pad base 62 can include a plywood plank that secures to a seat base foam 66.

Figure 9:
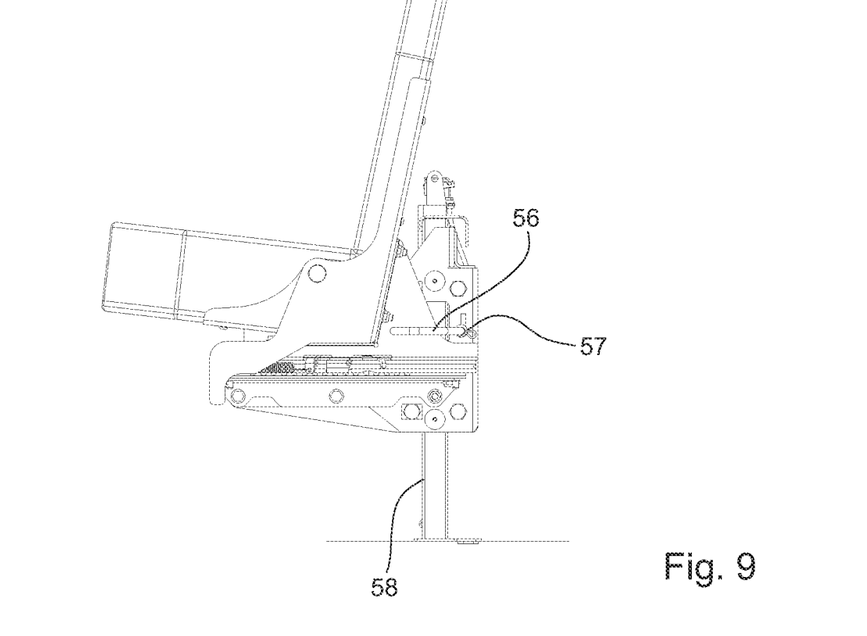
FIG. 9 is a side view of the conductor seat.

As seen in FIG. 9, the side view of the seat shows that the locking handle 56 has a locking handle 57 formed on the support frame 55. The locking handle 56 can extend through a sidewall of the support frame 55 and engage the piston height control located on the piston. The locking handle 56 can adjust the piston. The piston can have a spring mounted within for raising the seat when the locking handle 56 actuates the piston height control.

Figure 10:
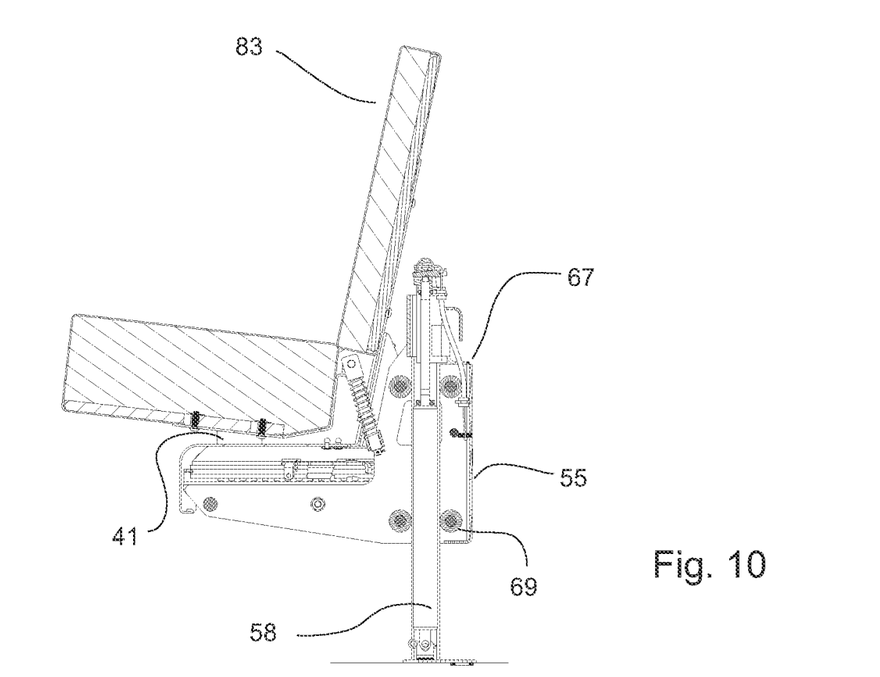
FIG. 10 is a side view of the conductor seat showing a cross-section of the seat in an upper position.
Figure 11:
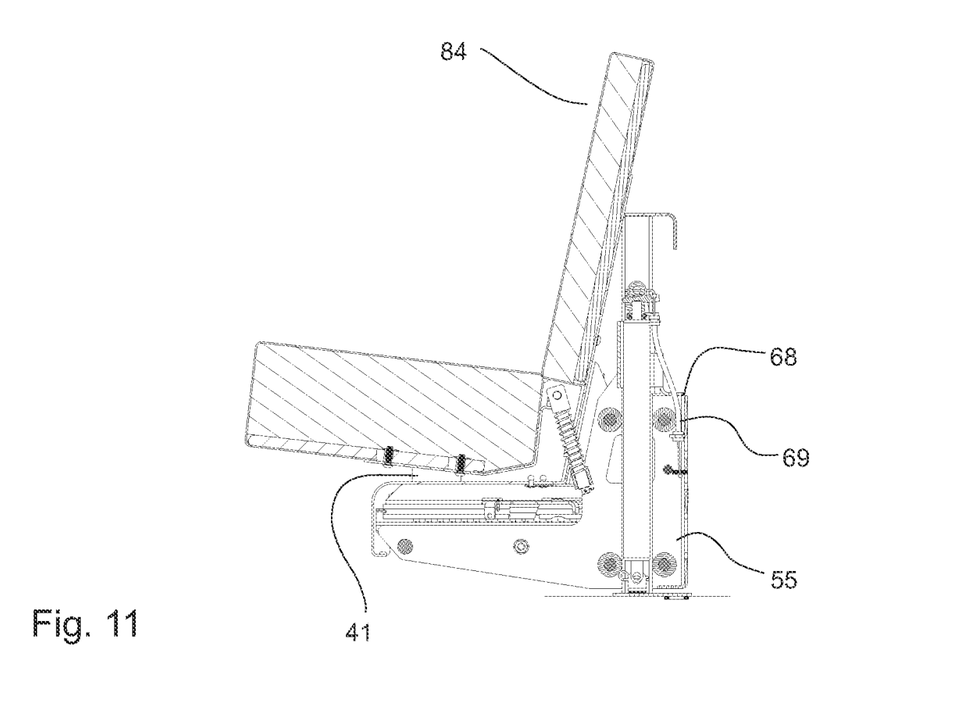
FIG. 11 is a side view of the conductor seat showing a cross-section of the seat in a lower position.

As seen in FIGS. 10 and 11, the seat upper position 83 and seat lower position 84 correspond to a support frame upper position 67 and a support frame lower position 68. Therefore, the seat moves with the support frame 55. The support frame 55 slides along the vertical rail 58 at vertical rail rollers 69. The seat frame 41 can further slide forward and backward relative to the support frame 55.

Figure 12:
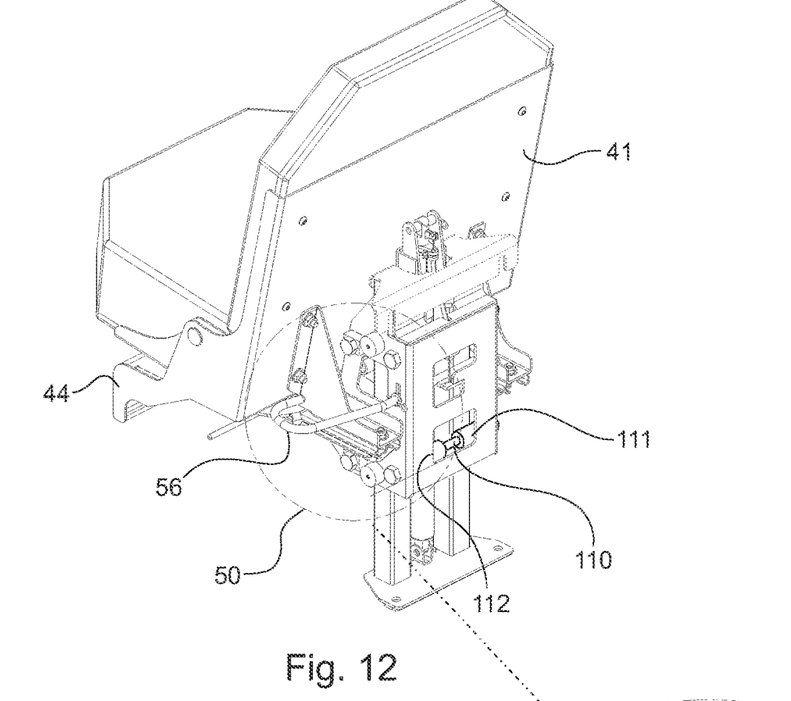
FIG. 12 is a rear perspective view of the seat.
Figure 13:
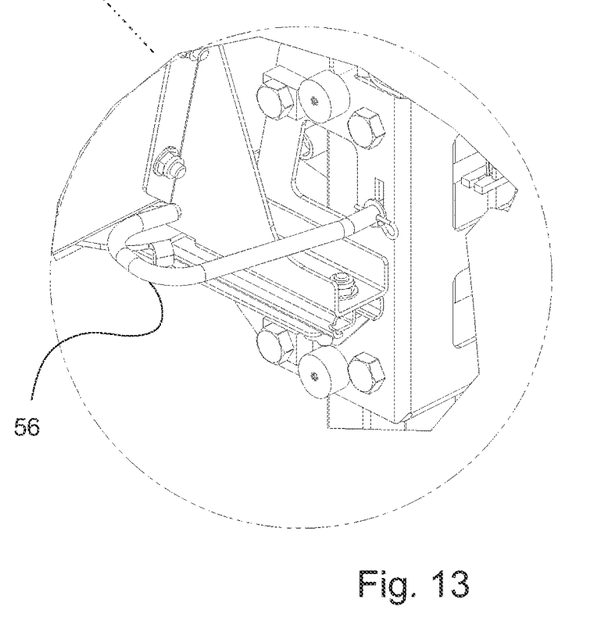
FIG. 13 is a zoom detailed view of the seat adjustment.

As seen in FIGS. 12 and 13, the rail roller 69 has a shaft that carries a left roller 112 and a right roller 111 with a shaft portion 110 between the left roller 112 and the right roller 111. The rollers bear on the front and rear surfaces of the vertical rail 58 which is formed on the left and right support posts. The left and right support posts are preferably rectangular for providing a flat front and rear surface. The right roller portion 111 and the left roller portion 112 have a larger diameter than the shaft portion 110. The shaft portion 110 can form a gap between the shaft and the support frame 55 so that a control cable passing from the height adjustment 50 locking handle 56 can pass between the right roller 111 and the left roller 112 along the support frame rear wall 93. The control cable can connect the locking handle 56 to the piston height control to allow actuation of the piston height control remotely.

Figure 14:
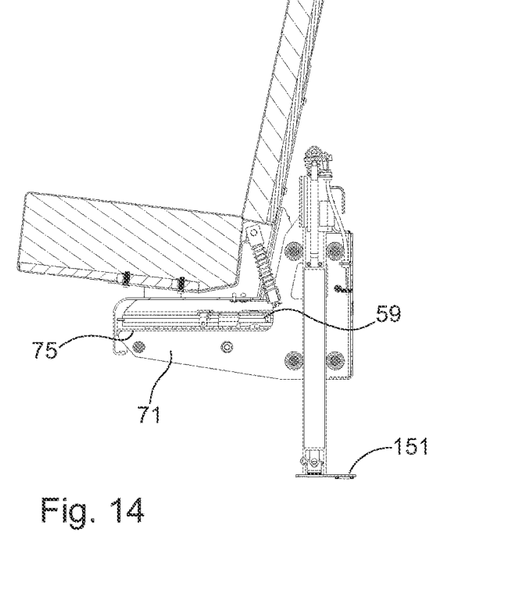
FIG. 14 is a side cross-section view of the seat in the deployed position.
Figure 15:
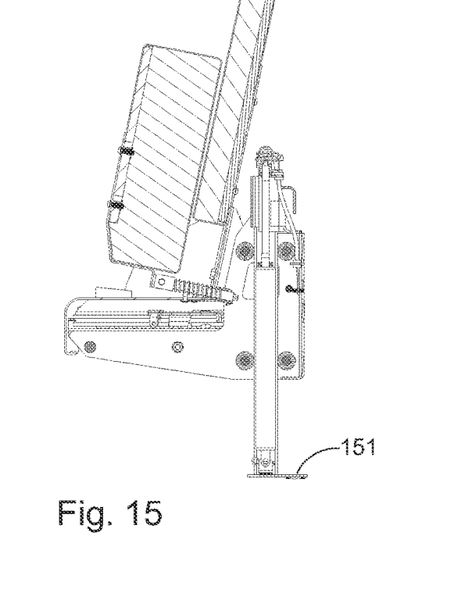
FIG. 15 is a side cross-section view of the seat is folded position.

As seen in FIGS. 14 and 15, the horizontal rail support 75 supports the horizontal rail 59. The support frame forward extension 71 extends forwardly from the support frame and supports the horizontal rail support 75. When the seat is flipped into the upward stowed position after use, the support frame forward extension 71 extends beyond the seat.

Figure 16:
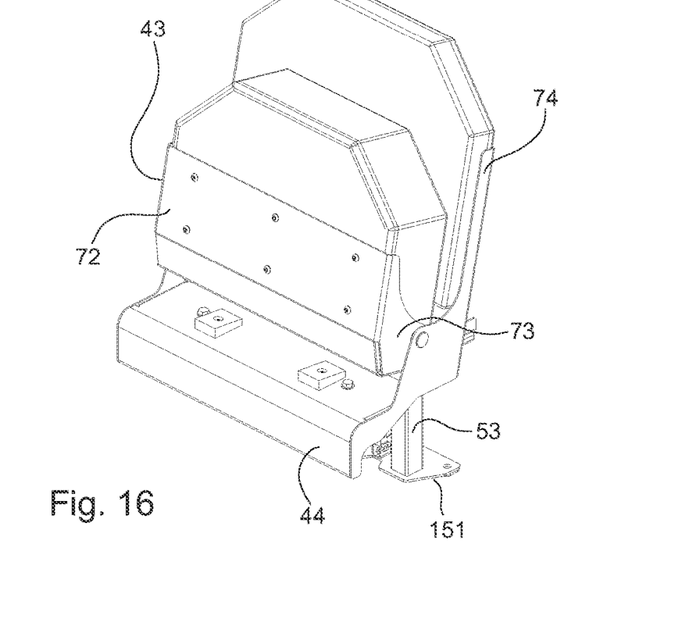
FIG. 16 is a perspective view of the seat in folded position.

As seen in FIG. 16, the main seat has a main seat pad frame 43 supporting the main seat pad. The main seat pad frame 43 extends outwardly at a left and right main seat pad frame side flange 73. The main seat pad frame lower support 72 can be screwed down to the plywood that supports the main seat pad. The main seat pad frame lower support 72 is preferably parallel to the seat frame back extension 74 when the main seat pad frame lower support 72 is rotated upwardly to a stowed position. The seat frame 44 extends upwardly to the seat frame back extension 74. The main seat has a base plate 151 that supports the left support posts 53 and the right support post 52.

Figure 17:
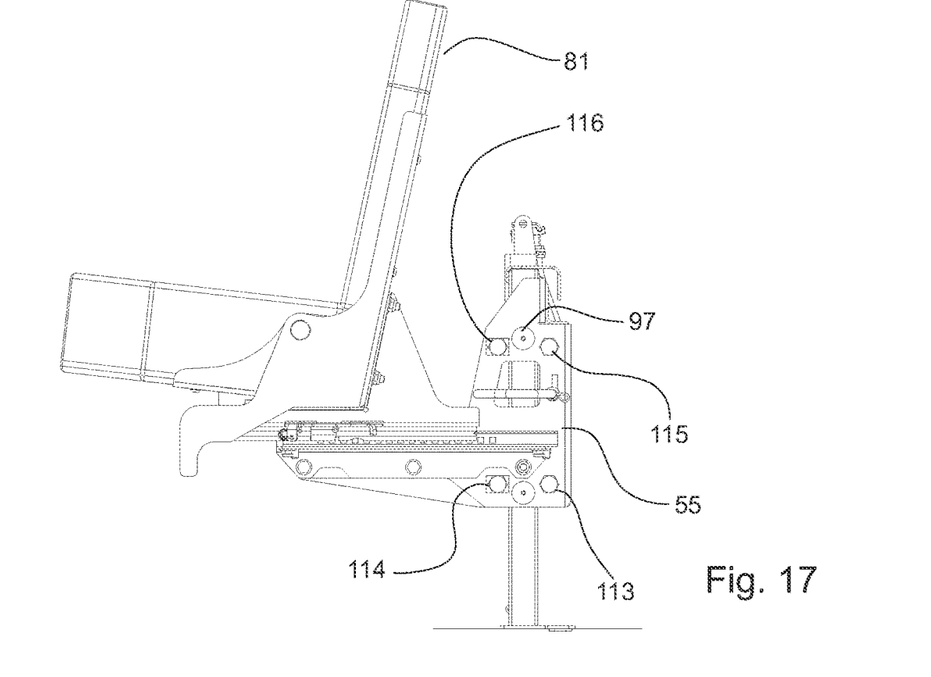
FIG. 17 is a side view of the seat in forward position.
Figure 18:
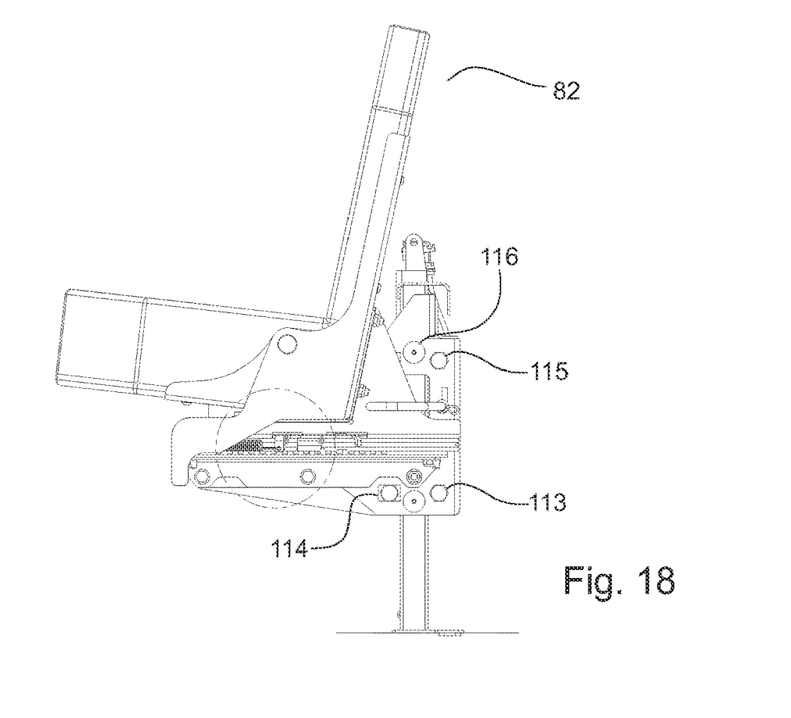
FIG. 18 is a side view of the seat in rear position.

As seen in FIGS. 17 and 18, the left glider pad 97 is mounted on the support frame 55. The support frame 55 also receives the lower rear vertical rail roller 113, the lower front vertical rail roller 114, the upper rear vertical rail roller 115, and the upper front vertical rail roller 116. These rail rollers provide vertical adjustment and remain in the same position between a forward position 81 and a rearward position 82.

Figure 19:
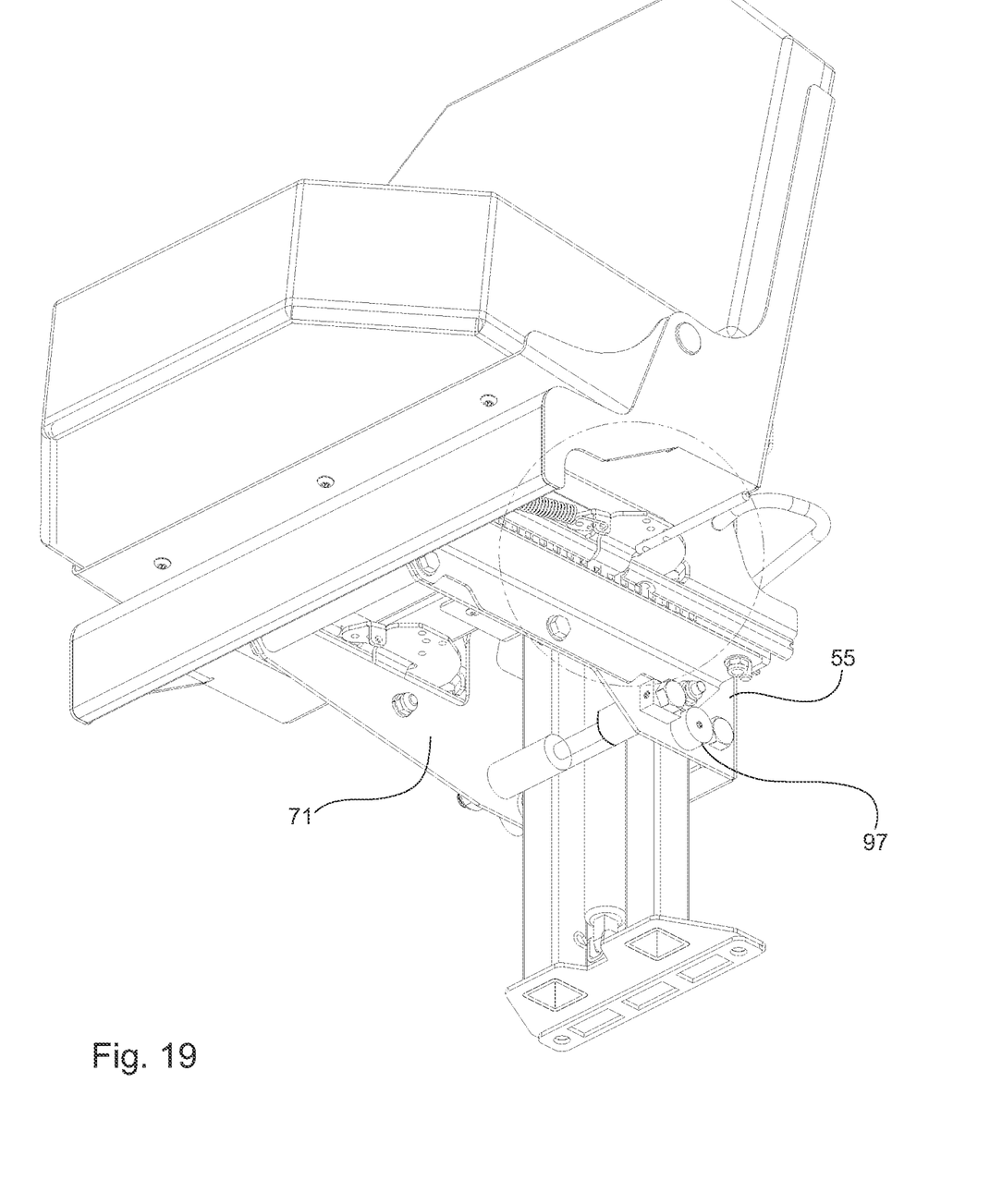
FIG. 19 is a lower perspective view of the seat showing the sliding rails for adjusting position.

As seen in FIG. 19, the left glider pad 97 can also be installed at a lower portion of the support frame 55.

Figure 20:
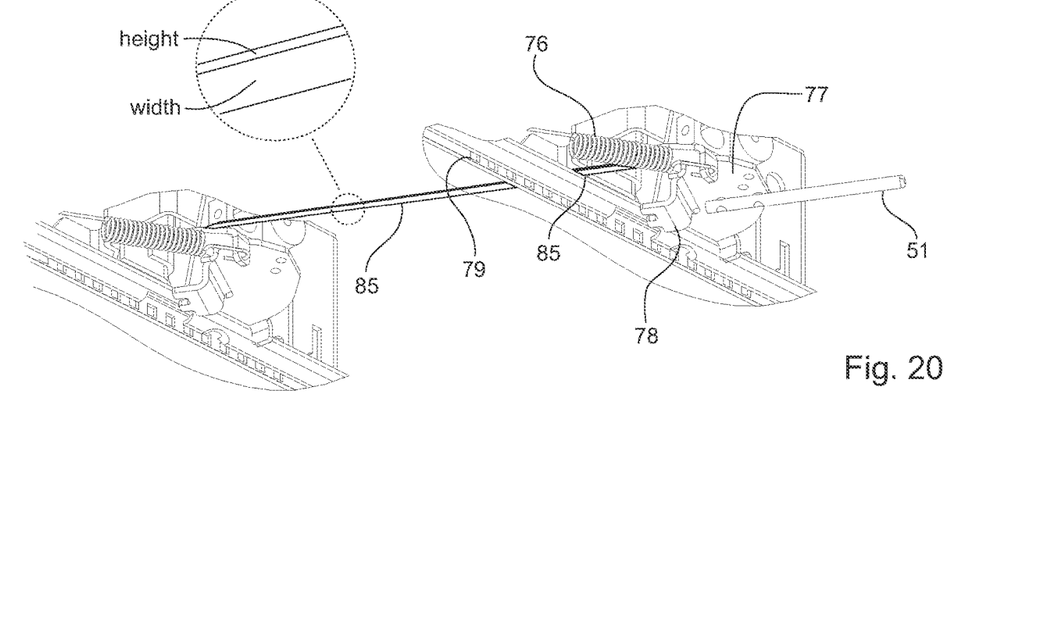
FIG. 20 is a zoom close-up view of the horizontal adjustment mechanism.

As seen in FIG. 20, the pushback handle 51 is connected to a pivot frame 77. The pivot frame 77 is pivotally connected to the seat frame 41. A handle retainer spring 76 pulls the pivot frame 77 into a detention bias by engaging the engagement member 78 into the horizontal adjustment receiver 79. The horizontal adjustment receiver 79 can be formed as a rail having rectangular vertical openings such as square openings in a series along the horizontal sliding rail. The engagement member 78 can be formed as an extension having a pair of teeth that engaging to the rectangular vertical openings of the horizontal adjustment receiver 79. The pushback handle 51 can release the engagement member 78 from the horizontal adjustment receiver 79. The latch transfer rod 85 transfers the tension from the first pivot frame 77 to the second pivot frame 177. The second. Frame 177 actuates the second engagement member 178 to engage and disengage to the second adjustment receiver 179. Optionally, a second handle retainer spring 176 can bias the second engagement member 178 to the second adjustment receiver 179.

Figure 21:
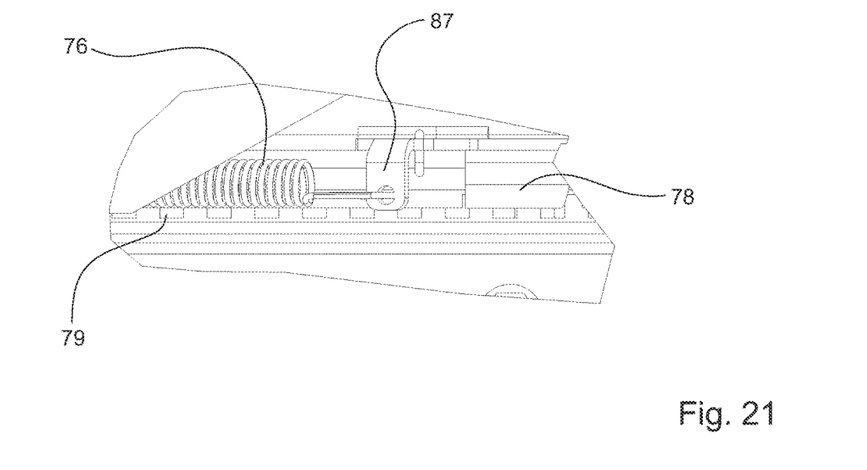
FIG. 21 is a side view of the horizontal adjustment mechanism.

As seen in FIG. 21, the handle retainer spring 76 can lay flat against the horizontal adjustment receiver 79 such that the handle retainer spring connects to a spring mounting extension 87 on the pivot frame 77. The engagement member 78 can engage the horizontal adjustment receiver 79 when the handle retainer spring is in tension.

Figure 22:
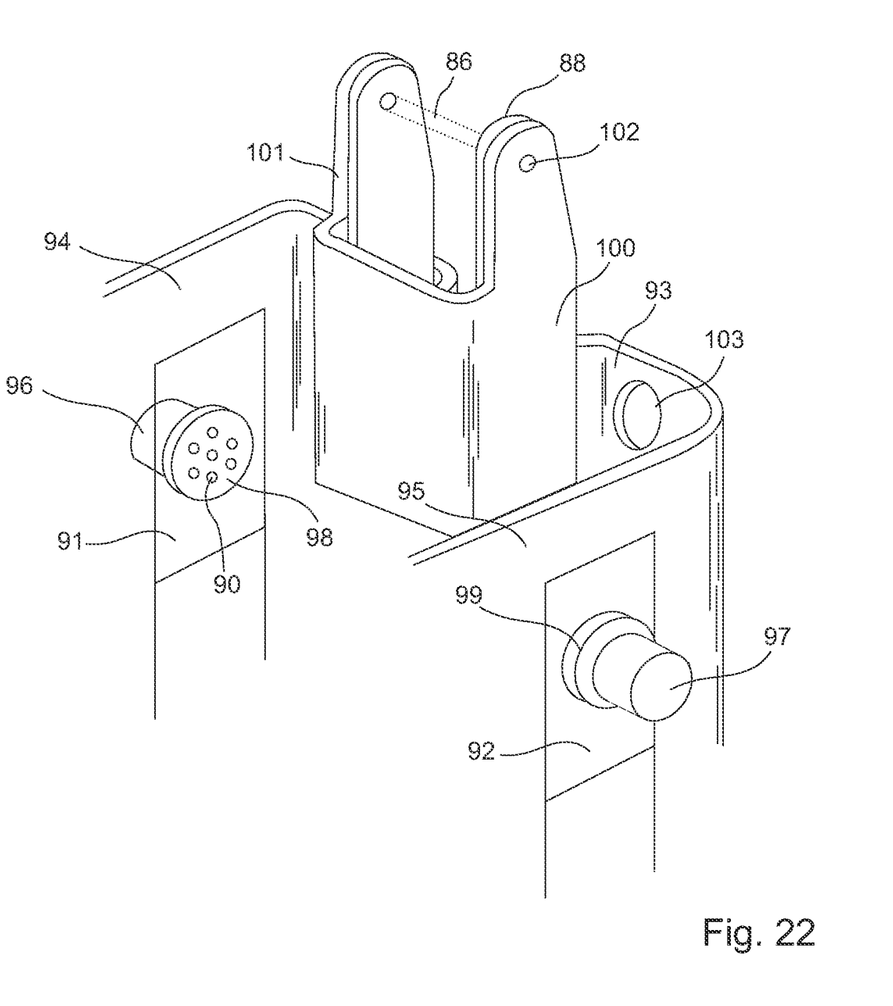
FIG. 22 shows the glider pad installation to the support frame.

As seen in FIG. 22, the left glider pad 97 and the right glider pad 96 engage the left support post left exterior wall 92 and the right support post right exterior wall 91. This provides additional dampening and left right stability. Glider pad head inserts can be mounted to the left glider pad head 99 and the right glider pad head 98. The left glider pad 97 can be mounted to the support frame left wall 95 and the right glider pad 96 can be mounted to the support frame right wall 94. The support frame left wall 95 and the support frame right wall 94 can connect together at the support frame rear wall 93. The support frame rear wall 93 has a support frame rear wall opening 103 which decreases weight and adds flexibility to the support frame rear wall 93.

The piston upper connection 86 connects to a piston receiver frame 88. The piston receiver frame 88 receives a frame sheath upper extension 102. The frame sheath upper extension 102 extends upwardly from the piston receiver frame sheath 100. The piston receiver frame sheath 100 extends downwardly and optionally connects to the support frame rear wall 93.

The glider pad head inserts 90 can be made of graphene which are held in copper pad heads of the left glider pad 97 and the right glider pad 96. The graphene glider pad head inserts 90 of the right glider pad head 98 can bear on the right support post right exterior wall 91 and the graphene glider pad head inserts 90 of the left glider pad head 99 can bear on the left support post left exterior wall 92.

Figure 23:
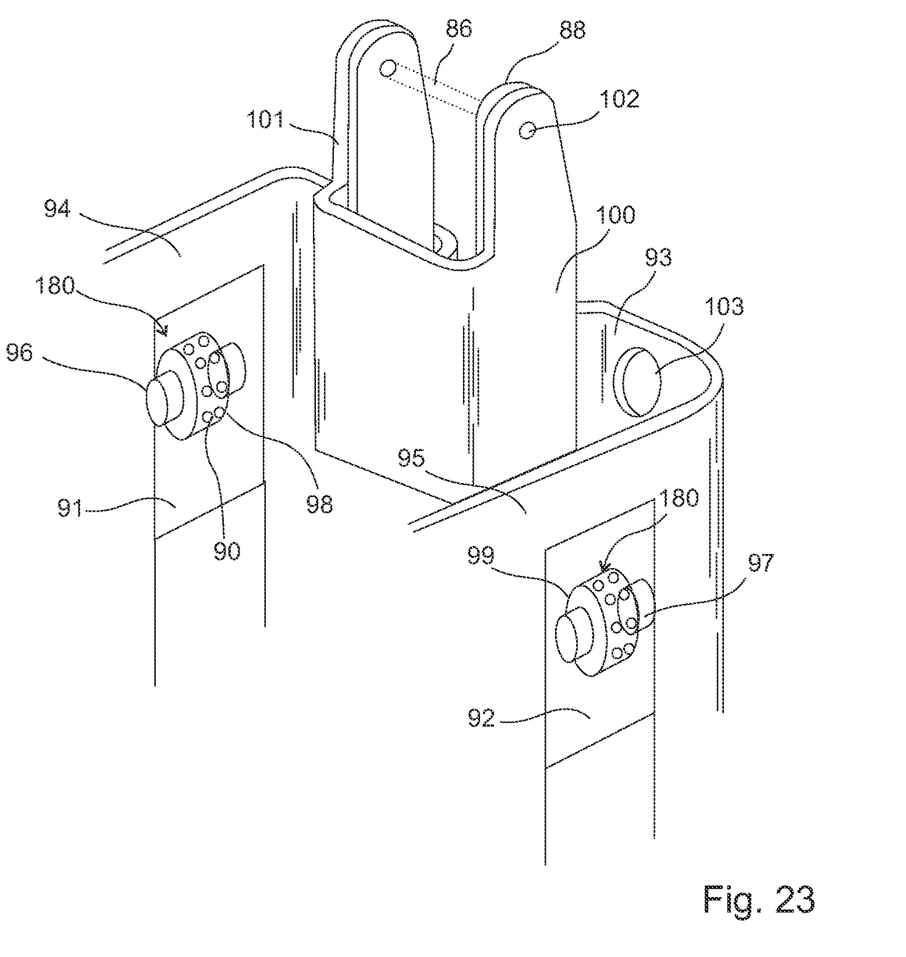
FIG. 23 shows the glider pad installation to the support frame where the glider pad is a roller.

As seen in FIG. 23, the left glider pad 97 and the right glider pad 96 can be made as a glider pad wheel 180.

Figure 24:
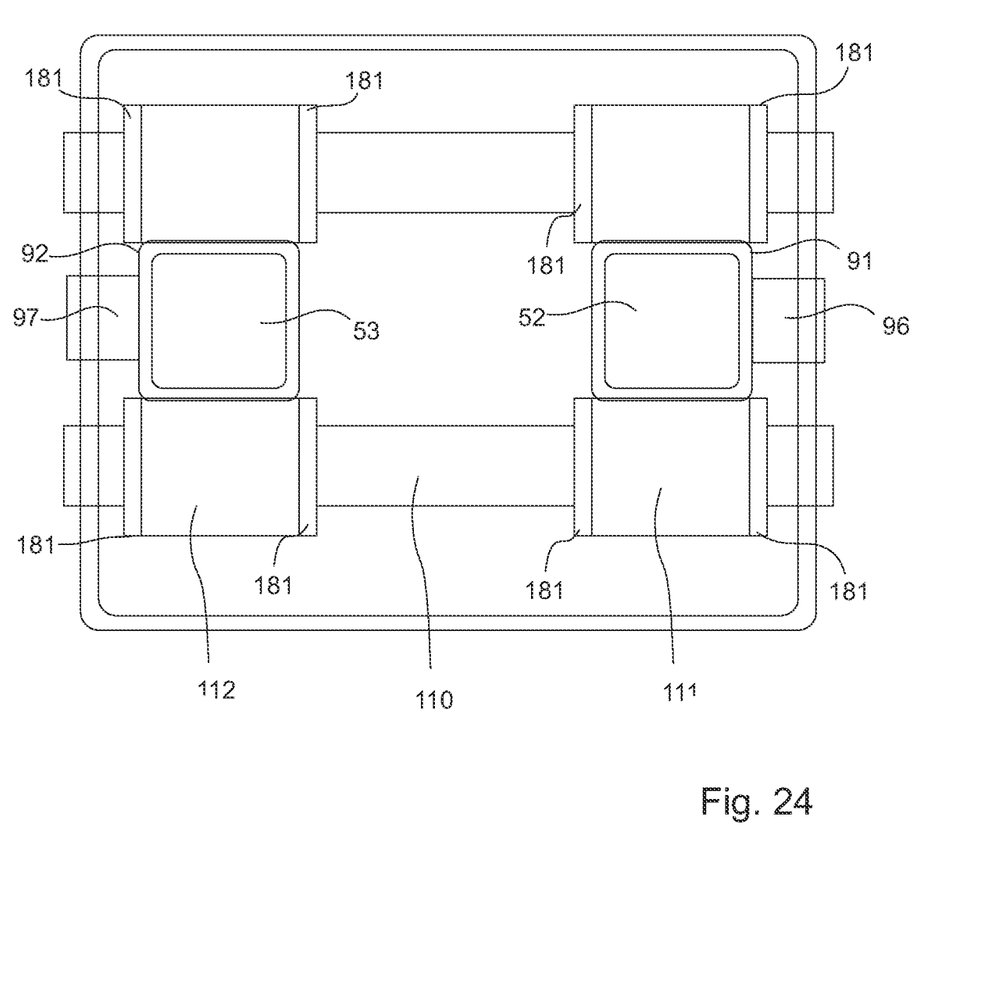
FIG. 24 shows a top cross section with the glider pad on the support frame rolling on the vertical rails.

As seen in FIG. 24, the vertical rollers 69 such as the lower rear vertical rail roller, lower front vertical rail roller, upper rear vertical rail roller, and upper front vertical rail roller can be made with a pair of stiffer portions 181 sandwiching a softer portion so that the pair of stiffer portions 181 of the rollers wrap around the vertical posts and grab the rounded corners of the vertical posts for enhanced grip.

The invention claimed is:
1. A conductor chair comprising:
   a. a main seat pad;
   b. a main seat pad frame, a main seat pad, wherein the main pad is mounted to the main seat pad frame;
   c. a back support;
   d. a seat frame, wherein the back support is mounted to the seat frame;
   e. a seat hinge mounted to the seat frame, wherein the seat hinge connects the main seat pad to the main seat pad frame providing the main seat pad with a bimodal operation between a vertical stowed position and a deployed position;
   f. a support frame, wherein the support frame supports a horizontal rail, wherein the horizontal rail supports the seat frame, wherein the seat frame is adjustable between a forward and backward position;
   g. a vertical rail, wherein the support frame is slide mounted to the vertical rail;
   h. vertical rail rollers, wherein the vertical rail rollers are mounted to the support frame, wherein the vertical rail rollers roll on the vertical rail;
   i. wherein the main seat pad frame supports the main seat pad; and
   j. a base plate, wherein the base plate is connected to the vertical rail.
2. The conductor chair of claim 1, wherein the vertical rail rollers have a roller left portion, a roller right portion and a shaft portion, wherein the vertical rail further includes a left support post and a right support post, wherein the roller left portion rolls on a left support post exterior wall, and wherein the roller right portion rolls on a right support post exterior wall.
3. The conductor chair of claim 2, wherein the vertical rail rollers include a upper rear vertical rail roller opposing an upper front vertical rail roller and a lower rear vertical rail roller opposing a lower front vertical rail roller.
4. The conductor chair of claim 1, further including:
   a. an engagement member engaging to an adjustment receiver, wherein the adjustment receiver is mounted to the horizontal rail;
   b. a handle retainer spring, and an engagement receiver, wherein the handle retainer spring biases the engagement member to the engagement receiver;
   c. a pushback handle, wherein the pushback handle moves to release the engagement member from the adjustment receiver.
5. The conductor chair of claim 4, further including:
   a. a second engagement member engaging to a second adjustment receiver, wherein the second adjustment receiver is mounted to a second horizontal rail;
   b. a second handle retainer spring, wherein the second handle retainer spring biases the second engagement member to the second engagement receiver;
   c. a latch transfer rod and connecting between a first pivot frame and a second pivot frame, wherein the pushback handle moves to release the engagement member from the adjustment receiver and the second engagement member from the second adjustment receiver.
6. The conductor chair of claim 5, wherein the latch transfer rod has a flat rectangular cross-section with a latch transfer rod width greater than a latch transfer rod height.
7. The conductor chair of claim 1, wherein the back support further includes a seatback foam mounted over a seatback base, wherein the seatback foam overlaps an upper edge of the seatback base at a seat foam upper overlap.
8. The conductor chair of claim 1, wherein the support frame has a support frame right wall connecting to a support frame rear wall connecting to a support frame left wall, wherein the support frame right wall receives a right glider pad mounted to glide along a right support post right exterior wall, wherein the support frame left wall receives a left glider pad mounted to glide along a left support post left exterior wall.
9. The conductor chair of claim 1, wherein a support frame rear wall has a support frame rear wall, wherein the support frame rear wall has a support frame rear wall opening, wherein the support frame rear wall is more flexible and lighter than a support frame right wall or a support frame left wall.
10. The conductor chair of claim 1, wherein a support frame rear wall connects to a piston receiver frame, wherein the piston receiver frame has an upper piston connection, wherein the piston receiver frame receives a frame sheath upper extension extending upwardly from a frame sheath, wherein the frame sheath connects to the support frame rear wall and extends upwardly above the support frame rear wall, wherein the frame sheath upper extension extends to the piston upper connection and supports the piston upper connection.
11. The conductor chair of claim 10, wherein the vertical rail rollers have a roller left portion, a roller right portion and a shaft portion, wherein the vertical rail further includes a left support post and a right support post, wherein the roller left portion rolls on a left support post exterior wall, and wherein the roller right portion rolls on a right support post exterior wall.

12. The conductor chair of claim 11, wherein the vertical rail rollers include a upper rear vertical rail roller opposing an upper front vertical rail roller and a lower rear vertical rail roller opposing a lower front vertical rail roller.

13. The conductor chair of claim 10, further including:
a. an engagement member engaging to an adjustment receiver, wherein the adjustment receiver is mounted to the horizontal rail;
b. a handle retainer spring, wherein the handle retainer spring biases the engagement member to the engagement receiver;
c. a pushback handle, wherein the pushback handle moves to release the engagement member from the adjustment receiver.

14. The conductor chair of claim 13, further including:
a. a second engagement member engaging to a second adjustment receiver, wherein the second adjustment receiver is mounted to a second horizontal rail;
b. a second handle retainer spring, wherein the second handle retainer spring biases the second engagement member to the second engagement receiver;
c. a latch transfer rod connects between a first pivot frame and a second pivot frame, wherein the pushback handle moves to release the engagement member from the adjustment receiver and the second engagement member from the second adjustment receiver.

15. The conductor chair of claim 14, wherein the latch transfer rod has a flat rectangular cross-section with a latch transfer rod width greater than a latch transfer rod height.

16. The conductor chair of claim 15, wherein the back support further includes a seatback foam mounted over a seatback base, wherein the seatback foam overlaps an upper edge of the seatback base at a seat foam upper overlap.

17. The conductor chair of claim 16, wherein the support frame has a support frame right wall connecting to a support frame rear wall connecting to a support frame left wall, wherein the support frame right wall receives a right glider pad mounted to glide along a right support post right exterior wall, wherein the support frame left wall receives a left glider pad mounted to glide along a left support post left exterior wall.

18. The conductor chair of claim 17, wherein the support frame rear wall has a support frame rear wall, wherein the support frame rear wall has a support frame rear wall opening, wherein the support frame rear wall is more flexible and lighter than the support frame right wall or the support frame left wall.

19. The conductor chair of claim 18, wherein vertical rail rollers have a pair of stiffer portions sandwiching a softer portion so that the pair of stiffer portions of the rollers wrap around vertical posts.

* * * * *